US005495344A

United States Patent [19]

Callaway, Jr. et al.

[11] Patent Number: 5,495,344

[45] Date of Patent: Feb. 27, 1996

[54] FACSIMILE PAGING SYSTEM WITH VIRTUAL DISPLAY CAPABILITY AND METHOD THEREFOR

[75] Inventors: Edgar H. Callaway, Jr., Boca Raton; Gregg E. Rasor, Boynton Beach, both of Fla.

[73] Assignee: Motorola, Inc., Schaumburg, Ill.

[21] Appl. No.: 130,805

[22] Filed: Oct. 4, 1993

[51] Int. Cl.$^{6}$ .......... H04M 1/00

[52] U.S. Cl. .......... 358/407; 358/400; 379/57

[58] Field of Search .......... 358/400, 404, 358/407, 402, 405, 434, 435, 436; 379/57, 100; 340/825.44, 311.1

[56] References Cited

U.S. PATENT DOCUMENTS

| | | | |
|---|---|---|---|
| 4,934,773 | 6/1990 | Becker | 350/6.6 |
| 4,940,963 | 7/1990 | Gutman et al. | 340/825.44 |
| 5,166,932 | 11/1992 | Hobb et al. | 370/95.1 |

FOREIGN PATENT DOCUMENTS

| | | | |
|---|---|---|---|
| 0001363 | 1/1989 | Japan | 379/57 |
| 01206758 | 5/1990 | Japan | 379/57 |
| 092003883 | 5/1992 | WIPO | N04M 11/00 |

*Primary Examiner*—Edward L. Coles, Sr.
*Assistant Examiner*—Jerome Grant, II
*Attorney, Agent, or Firm*—Gregg E. Rasor

[57] ABSTRACT

A paging system includes a plurality of paging receivers (14, 16), each paging receiver having a display (19) for presenting the at least a portion of a representation of graphic information which substantially resembles at least a portion of graphic information received from a facsimile unit (11). The paging system further includes a paging terminal (13) capable of receiving graphic information received from the facsimile unit (11) and transmitting the representation of graphic information to the paging receiver (16).

14 Claims, 2 Drawing Sheets

FACSIMILE PAGING SYSTEM WITH VIRTUAL DISPLAY CAPABILITY AND METHOD THEREFOR

FIELD OF THE INVENTION

This invention relates in general to paging systems and more particularly to a facsimile paging system.

BACKGROUND OF THE INVENTION

Conventional paging systems typically deliver messages to conventional pagers via signaling protocols that support tone-only, tone and voice, numeric, and alphanumeric data transmission. These choices are acceptable in most circumstances, but when a person desires to convey a substantial amount of complex information to a paging subscriber, no efficient method exists to accommodate this desire.

As an alternative, a facsimile paging system may be constructed to deliver digitized representations of textural or graphical data representing a message for conveyance to the paging subscriber. The problem with transporting and presenting a facsimile message is that conventional paging systems have no means for conditioning the data (e.g. CCITT group III or group IV facsimile) for either effective radio link transmission (e.g., error correction/detection or the like) or display of a received message on a receiver display having a display density different from that as intended by the source facsimile machine.

Thus, what is needed is a facsimile paging system that is capable of adapting conventional CCITT group III or group IV facsimile transmissions for broadcast to and presentation on at least one selected paging receiver.

SUMMARY OF THE INVENTION

Briefly, according to the invention, there is provided a paging system including a paging terminal and a plurality of paging receivers, the paging system being capable of transmitting graphic information to a paging receiver of the plurality of paging receivers. The paging system comprises a the paging terminal having a receiver for receiving the graphic information from a facsimile unit, a processor for generating a representation of the received graphic information, and a transmitter for transmitting a message including at least a portion of the representation of the graphic information to the paging receiver. The paging system further comprises a paging receiver having presentation means for presenting the at least a portion of the representation of the graphic information which substantially resembles at least a portion of the graphic information received from the facsimile unit.

Additionally, a method is implemented in the paging system for transmitting graphic information to the paging receiver of the plurality of paging receivers, the method comprising the steps at the paging terminal of receiving the graphic information from a facsimile unit, generating a representation of the received graphic information, and transmitting a message including at least a portion of the representation of the graphic information to the paging receiver. Furthermore, the method comprises, at the paging receiver, presenting the at least a portion of the representation of the graphic information which substantially resembles at least a portion of the graphic information received from the facsimile unit.

DESCRIPTION OF A PREFERRED EMBODIMENT

Generally, the present invention provides a method and apparatus for transmitting graphic information to a paging receiver. This is accomplished by transmitting the graphic information, along with a selection signal, from a facsimile unit to a paging terminal. At the paging terminal, information describing the type of display present on the selected paging receiver (aspect ratio, density, color or monochrome, etc.) is used by the terminal to generate a representation of the graphic information, which is then transmitted to the paging receiver. The paging receiver may then display at least a portion of the graphic information.

Figure 1:
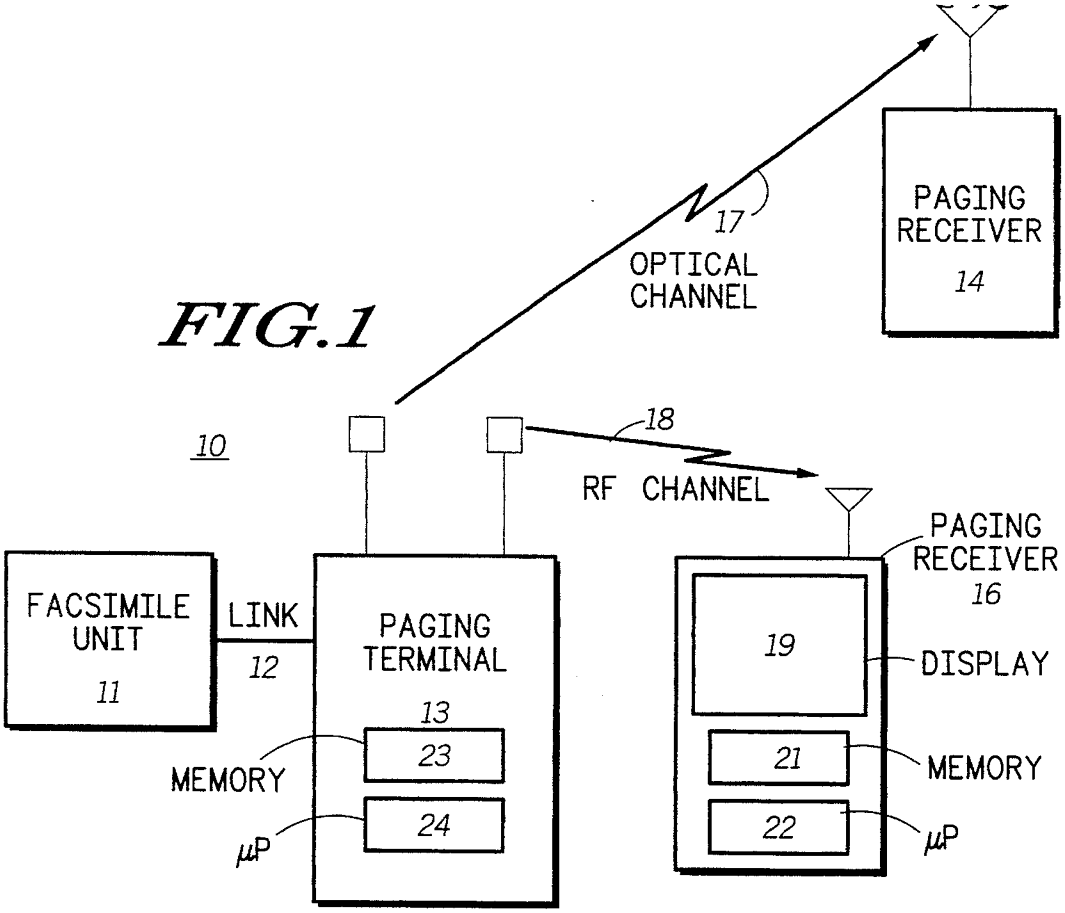
FIG. 1 is a block diagram of a facsimile paging system in accordance with the preferred embodiment of the present invention.
Figure 2:
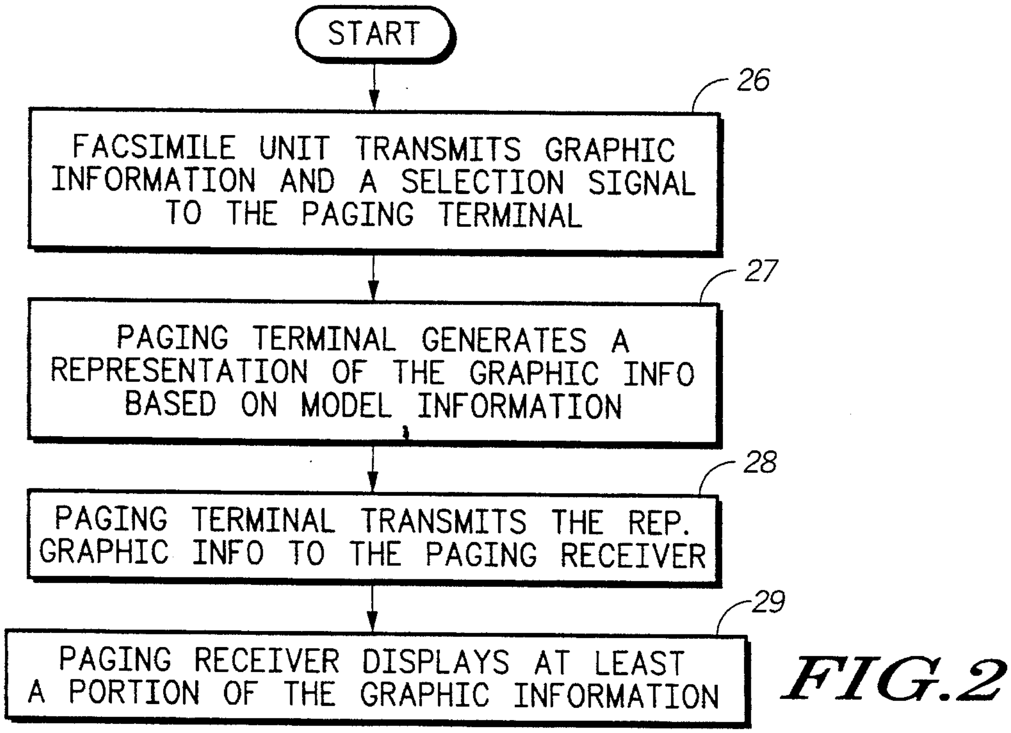
FIG. 2 is a flow chart illustrating the operation of the facsimile paging system of FIG. 1 in accordance with the preferred embodiment of the present invention.
Figure 3:
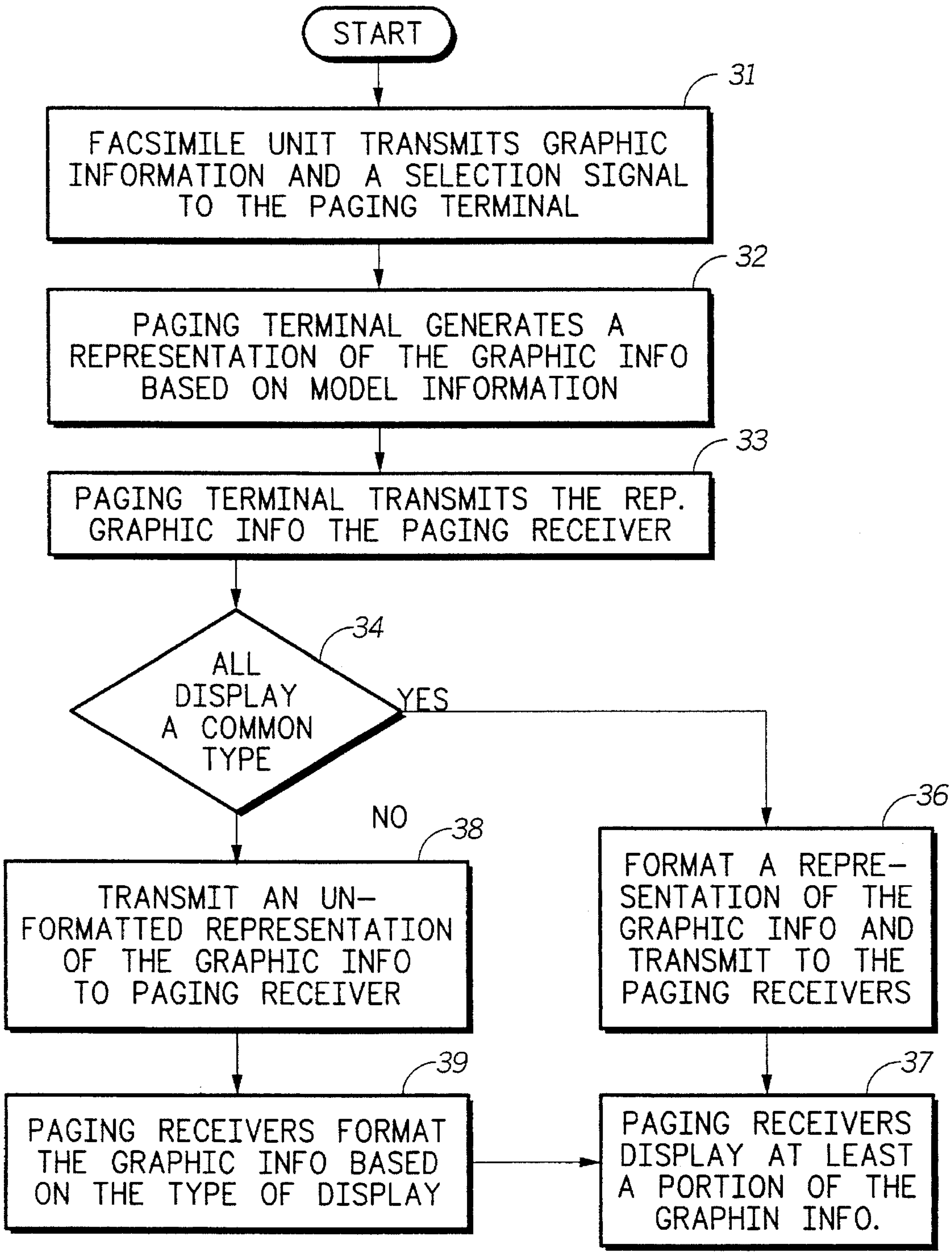
FIG. 3 is a flow chart illustrating the operation of the facsimile paging system of FIG. 1 in accordance with an alternate embodiment of the present invention.

The present invention can be more fully understood with reference to FIGS. 1–3. FIG. 1 illustrates a paging system 10 that includes a paging terminal 13 that is coupled to a facsimile unit 11 via a link 12. The facsimile unit 11 may be a facsimile machine, a computer, a conventional document scanner, or possibly a dedicated message entry device.

The paging system 10 further includes a plurality of paging receivers 14–16 that receive information from the paging terminal 10 over radio frequency channels 18 or optical channels 17. The paging receivers 14–16 may be battery powered, and operate to receive a signal via an antenna. A receiver couples a received signal to a demodulator, which recovers any information present using conventional techniques. The recovered information is coupled to a controller that interprets and decodes the recovered information. In the preferred embodiment, the controller may comprise a processor 22 and both volatile and non-volatile memories 21. At least a portion of the recovered information is then presented on a display 19. The display 19 may be a conventional flat-panel display, such as an LCD, but in the preferred embodiment would be a virtual display, consisting of light-emitting elements or the like, the outputs of which are transmitted through magnifying optics to the user. The use of a virtual display enables the presentation of a large, easily legible image from a physically small device. The paging receiver may thus be significantly smaller than the image presented to the user, who may then view the information presented on the display 19 by activating the appropriate controls.

The paging terminal 13 includes a processor 24 that receives the incoming graphical information from a link 12, and operates on it to produce a representation of the received graphic information suitable for transmission on either optical channels 17 or radio frequency channels 18. The processor 24 determines the pager display characteristics by correlating a selection signal with a database record (as may be stored in memory 23) corresponding with the selected paging receiver, thus establishing corresponding pager model information. Memory 23 is non-volatile programmable, memory.

FIG. 2 is a flow chart illustrating the operation of the facsimile paging system of FIG. 1 in accordance with the preferred embodiment of the present invention.

At step 26, the facsimile unit transmits graphic information and the selection signal to the paging terminal. The graphic information may be any information that may be represented on a printed page; for example, the graphic information may be handwritten Japanese Kanji characters. The selection signal is a signal used by the originator of the graphic information to identify the paging receiver for which the graphic information is intended.

In a first embodiment, the selection signal may be one or more symbols or aliases placed on the graphical information to identify the desired paging receiver. For example, the address or alias of the desired paging receiver may be typewritten or handwritten characters, a selected "check box," or possibly a bar code. Another alternative might be to affix a pre-printed label to the transmitted document in an area, the label containing coded (e.g., bars, symbols, etc.) information representing the user's selection signal. In any case, the recognized object may represent either directly (absolute data) or indirectly (as a pointer to information stored in a memory location accessible by the processor 24) the targeted user.

In a second embodiment, a user wanting to send graphical information to a paging receiver would call the terminal using a conventional telephone and enter the desired selection signal prior to graphical information transmission. As in the first embodiment, a previously agreed-upon alias may also be used as the selection signal.

Should the sender desire to transmit only a portion of the graphic information, the area to be transmitted may be identified by drawing a box around the area, or identifying the area by the use of special symbols. Another option would be to use pre-printed forms which define the area to be transmitted.

At step 27, processor 24 in the paging terminal 13 generates a representation of the graphic information received from the facsimile unit, for transmission to the paging receiver. Graphic information not desired by the sender to be transmitted is first separated from that desired to be transmitted. The remaining graphic information is then further processed as described below.

Since the display model of the paging receiver may not have the same imaging properties (density, aspect ratio, etc.) as the graphic information received from the facsimile unit, the graphic information may be processed by the paging terminal to generate a representation of the graphic information that uses the display of the paging receiver to best advantage, while minimizing the amount of data to be transmitted; for example, the aspect ratio may be modified or blank areas deleted. In particular, if the display does not have scroll or zoom features, data defining graphic features of a size less than the display resolution may be removed, without substantially affecting the resulting image displayed at the paging receiver.

In a first embodiment, information describing the imaging properties of the paging receiver's display model may be stored in a database accessible by the processor 24. In a second embodiment, information describing the imaging properties of the paging receiver's display model may be encoded in the selection signal sent by the user.

After this display-dependent processing, the representation then undergoes data compression by conventional means, such as Huffman or fractal coding, to minimize the amount of data required to be transmitted.

At step 28, the compressed representation is then placed, as data, into a paging protocol capable of large-message transmission without error in a Rayleigh-fading channel, and transmitted to a paging receiver. An example of such a protocol would be Motorola's Flex protocol, which employs 8-bit interleaving as well as two-bit forward error correction, at 6400 baud. Due to the error correction, however, the effective rate of data transmission is only 3900 baud. It is this transmission rate that limits the amount of data that may be economically transmitted.

Should the amount of data to be transmitted exceed a limit pre-set by the paging terminal operator, the data may be divided and transmitted in sections, as system loading permits.

At step 29, the paging receiver receives the message including the representation of the graphic information, which is stored in RAM memory 21. In accordance with the recovered information, and settings associated with the user controls, the paging receiver signals the user via an audible, visual, or tactile alert that a message has been received. Under the control of the user, the paging receiver may continue to store the message in memory 21 for later display, or display the received information. To display the received information, processor 22 decompresses the received data, and sends at least a portion of the representation of the graphic information to the display driver for presentation on the display 19.

In a first embodiment of the presenting means, the representation of the graphic information on the paging receiver's display may be mapped into a virtual space that allows a user to scroll both up and down, and left and right, to view portions of a larger image with enhanced resolution. Additionally, the user may zoom in and out, to magnify at least a portion of the displayed image.

Alternatively, a second embodiment of the virtual display may allow the user to maximize the apparent size of the viewed image, thereby reducing the necessity for scrolling and zooming. In this case, full pages of text may be viewed with a miniature paging receiver, which is very beneficial for countries such as Japan and China, whose languages are non-phonetic and therefore cannot be easily entered via keyboard into an alphanumeric paging system. In addition, drawings, artwork, and other types of graphic information can be seen in their entirety and in privacy, since the magnified image of the virtual display is viewable only by the user.

FIG. 3 illustrates a logic diagram that may be used to transmit graphic information to a group of paging receivers. At step 31, the facsimile unit transmits graphic information and a selection signal to the paging terminal. The graphic information may be any information that may be represented on a printed page; for example, the graphic information may be handwritten Japanese Kanji or Chinese characters. The selection signal is a signal used by the originator of the graphic information to identify the paging receivers for which the graphic information is intended. Should the sender desire to transmit only a portion of the graphic information, the area to be transmitted may be identified by drawing a box around the area, or identifying the area by the use of special symbols. Another option would be to use pre-printed forms which define the area to be transmitted.

At step 32, the paging terminal determines a group of paging receivers by decoding the selection signal received from the user. In a first embodiment, this is done by recognizing symbols or aliases placed on the graphical information as identifying paging receivers or groups of receivers. For example, the address or alias of the desired paging receiver(s) may be typewritten or handwritten characters, a selected "check box," or possibly a bar code; the alias having been established previously with the terminal operator to identify a group of desired recipients. Another alternative might be to affix a pre-printed label to the transmitted document in an area, the label containing coded (e.g., bars, symbols, etc.) information representing the user's selection signal. In any case, the recognized object may represent either directly (absolute data) or indirectly (as a pointer to information stored in a memory location accessible by the processor 24) the targeted user.

In a second embodiment, a user wanting to send graphical information to a group of paging receivers would call the terminal using a conventional telephone and enter the desired selection signals prior to graphical information transmission. As in the first embodiment, a previously agreed-upon alias may also be used as the selection signal.

The paging receivers may have many different types of displays, including LCD, LED, virtual, ferroelectric, etc., of differing sizes, and each may have different imaging properties. At step 33, the paging terminal determines the model of display present at each paging receiver to which a message is to be sent.

In a first embodiment, information describing the imaging properties of the paging receivers' display models may be stored in a database accessible by the processor 24. In an alternative embodiment, information describing the imaging properties of the paging receivers' display model may be encoded in the selection signal as sent by the user. In any case, information that may be stored includes aspect ratio, color or monochrome capability, resolution, pel (picture element) shape, etc. In the course of processing the received facsimile information, the resulting image data may be adjusted for the particular display type identified by either deleting or adding color information to effect presentation in a manner that uses the identified display to its best advantage.

After this display-dependent processing, the representation may then undergo data compression using conventional means such as Huffman or fractal coding, to minimize the amount of data required to be transmitted.

If all pagers to receive the message have the same display type, step 34 is true. The graphic information is processed at step 36 by processor 24 to generate a representation of the graphic information that uses the displays of the paging receivers to best advantage, as described above, and then transmitted over optical channels 17, RF channels 18, or both. At step 37, the paging receiver receives the transmitted message and then may display at least a portion of it, as described above, using processor 22, memory 21, and display 19.

If all pagers selected to receive the message do not have the same display type, step 34 fails, and the processor 24 does not perform display-dependent processing on the graphical information. At step 38 the graphic information, in this unformatted state, is placed, as data, into a paging protocol that prevents the introduction of significant errors in a communication channel while being capable of large-message transmission, the communication channel being characterized as a Rayleigh-fading channel or the like. The message is then transmitted to a paging receiver, as described above.

At step 39 the paging receiver receives the transmitted message. The received data is sent by processor 22 to memory 21, where at least a portion is stored. The processor 22 may then operate on the received data to generate a representation of the transmitted graphic information that best uses the display of the paging receiver (e.g., to maximize resolution, readability, etc.). For example, the group message could be sent to a plurality of paging receivers using electronic advertising signs as the display devices. The electronic signs may be of different sizes and shapes, and perhaps of different display resolution. In this case, the processor 22 of each paging receiver would operate on the received data so that the received message, perhaps a graphical advertisement, would be proportioned and sized for a best presentation on the available display. At least a portion of the representation may then be displayed on the display 19, at step 37.

In summary, the present invention provides a method and apparatus for transmitting graphic information to a paging receiver. With such a method and apparatus, the problem of practical graphical information transmission to a paging receiver is resolved. This in turn, enables economic alphanumeric paging to the many peoples of the world without a phonetic language. In addition, the present invention resolves the problem of transmitting facsimile messages to devices having different display models.

The paging system described includes a paging terminal and a plurality of paging receivers, and implements a method for transmitting graphic information to a group of paging receivers of the plurality of paging receivers. The method described comprises the steps of, at the paging terminal; receiving the graphic information and a selection signal from a facsimile unit; determining the group of paging receivers based on the selection signal; determining types of display on each of the paging receivers of the group of paging receivers; transmitting, when the each of the paging receivers in the group of paging receivers have a common display type, a message including a formatted representation of the graphic information to the group of paging receivers; and transmitting, when at least two paging receivers of the group of paging receivers have different display types, the message including an unformatted representation of the graphic information to the group of paging receivers.

In determining the group of paging receivers, the terminal identifies the group of paging receivers for which transmission of the message is intended in response to the selection signal. Furthermore, the paging terminal determines types of display on each of the paging receivers by identifying, using the selection signal, model information corresponding with each member of the group of paging receivers. This identification is accomplished by correlating the selection signal with a database record corresponding with each member of the group of paging receivers and model information corresponding thereto. The correlation effectively matches each member of the group of paging receivers with a predetermined paging receiver display aspect ratio and picture element density in response to identified model information corresponding with each member of the group.

As for delivering the message to one or more paging receivers, the paging terminal may transmit the message to the paging receivers via a wireless transmission. The wireless transmission may be effected using a radio frequency channel, an optical frequency channel, or any conventional means capable of delivering a modulated data carrier.

Once the message is transmitted, the paging receiver (or receivers) operate to receive the message. When each of the paging receivers in the group of paging receivers have a common display type, the transmitted message includes the formatted representation of the graphic information. Alternatively, when at least two paging receivers of the group of paging receivers have different display types, the transmitted message includes the unformatted representation of the graphic information. After reception by the paging receiver, one of two possibilities exist for display of the received message. In the first case, at least a portion of the formatted representation of the graphic information is presented, that portion substantially resembling at least a portion of the graphic information received from the facsimile unit. In the second case, the processor 22 processes the unformatted representation of the graphic information and presents the at least a portion of the processed unformatted representation of the graphic information in a form that substantially resembles at least a portion of the graphic information received from the facsimile unit. Finally, presentation is accomplished using a virtual reality display that allows the user to view a full page or more (a page such as an A4 size), or alternatively, pan and zoom on the image of the received message.

We claim:

1. In a paging system that includes a paging terminal and a plurality of paging receivers, a method for transmitting graphic information to a group of paging receivers of the plurality of paging receivers, the method comprising the steps of:

at the paging terminal:

receiving the graphic information and a selection signal from a facsimile unit;

determining the group of paging receivers based on the selection signal;

determining types of display on each of the paging receivers of the group of paging receivers;

transmitting, when the each of the paging receivers in the group of paging receivers have a common display type, a message including a formatted representation of the graphic information to the group of paging receivers; and transmitting, when at least two paging receivers of the group of paging receivers have different display types, the message including an unformatted representation of the graphic information to the group of paging receivers.

2. The method according to claim 1 wherein the first determining step comprises the step of:

identifying the group of paging receivers for which transmission of the message is intended in response to the selection signal.

3. The method according to claim 1 wherein the step of determining types of display on each of the paging receivers comprises the step of:

identifying, using the selection signal, model information corresponding with each member of the group of paging receivers.

4. The method according to claim 3 wherein the step of identifying model information comprises the step of:

correlating the selection signal with a database record corresponding with each member of the group of paging receivers and model information corresponding thereto.

5. The method according to claim 3 wherein the correlating step comprises the step of:

matching each member of the group of paging receivers with a predetermined paging receiver display aspect ratio and picture element density in response to identified model information corresponding with each member of the group.

6. The method at the paging terminal and according to claim 1 wherein the message transmitting step includes the step of:

transmitting the message to the group of paging receivers via a wireless transmission.

7. The method according to claim 6 wherein the message transmitting step further includes the step of:

transmitting the message to the group of paging receivers via the wireless transmission using a radio frequency channel.

8. The method at the paging terminal and according to claim 6 wherein the message transmitting step further includes the step of:

transmitting the message to the group of paging receivers via the wireless transmission using an optical frequency channel.

9. The method according to claim 1 comprising the steps of:

at the paging receiver:

receiving, when the each of the paging receivers in the group of paging receivers have a common display type, the message including the formatted representation of the graphic information; and presenting the at least a portion of the formatted representation of the graphic information which substantially resembles at least a portion of the graphic information received from the facsimile unit.

10. The method according to claim 9 wherein the presenting step includes the step of:

presenting the at least a portion of the representation of the graphic information using a virtual reality display.

11. The method according to claim 1 comprising the steps of:

at the paging receiver:

receiving, when at least two paging receivers of the group of paging receivers have different display types, the message including the unformatted representation of the graphic information;

processing the unformatted representation of the graphic information for presentation by the paging receiver and;

presenting the at least a portion of the processed unformatted representation of the graphic information in a form that substantially resembles at least a portion of the graphic information received from the facsimile unit.

12. The method according to claim 11 wherein the presenting step includes the step of:

presenting the at least a portion of the representation of the graphic information using a virtual reality display.

13. A paging terminal capable of transmitting graphic information to a group of paging receivers of a plurality of paging receivers, the paging terminal comprising:

a receiver for receiving the graphic information and a selection signal from a facsimile unit;

a processor for determining the group of paging receivers based on the selection signal, determining types of display on each of the paging receivers of the group of paging receivers; and a transmitter for transmitting a message including a formatted representation of the graphic information to the group of paging receivers when the each of the paging receivers in the group of paging receivers have a common display type, and when at least two paging receivers of the group of paging receivers have different display types, transmitting the message including an unformatted representation of the graphic information to the group of paging receivers.

14. In a paging terminal, a method for transmitting graphic information to a group of paging receivers of a plurality of paging receivers, the method comprising the steps of:

receiving the graphic information and a selection signal from a facsimile unit;

determining the group of paging receivers based on the selection signal;

determining types of display on each of the paging receivers of the group of paging receivers;

transmitting, when the each of the paging receivers in the group of paging receivers have a common display type, a message including a formatted representation of the graphic information to the group of paging receivers; and transmitting, when at least two paging receivers of the group of paging receivers have different display types, a message including an unformatted representation of the graphic information to the group of paging receivers.

* * * * *